(12) United States Patent
Ono et al.

(10) Patent No.: US 10,483,521 B2
(45) Date of Patent: Nov. 19, 2019

(54) SEALED BATTERY AND MANUFACTURING METHOD OF SEALED BATTERY

(71) Applicant: Toyota Jidosha Kabushiki Kaisha, Toyota-shi, Aichi-ken (JP)

(72) Inventors: Tomohiro Ono, Miyoshi (JP); Yuta Nemoto, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/106,837

(22) Filed: Aug. 21, 2018

(65) Prior Publication Data
US 2019/0074502 A1 Mar. 7, 2019

(30) Foreign Application Priority Data
Sep. 7, 2017 (JP) .................... 2017-172556

(51) Int. Cl.
| | | |
|---|---|---|
| *H01M 2/08* | (2006.01) | |
| *H01M 2/10* | (2006.01) | |
| *H01M 2/12* | (2006.01) | |
| *H01M 2/34* | (2006.01) | |
| *H01M 4/04* | (2006.01) | |

(52) U.S. Cl.
CPC ............ *H01M 2/345* (2013.01); *H01M 2/08* (2013.01); *H01M 2/1094* (2013.01); *H01M 2/1241* (2013.01); *H01M 4/0419* (2013.01); *H01M 2200/10* (2013.01); *H01M 2220/20* (2013.01)

(58) Field of Classification Search
None
See application file for complete search history.

(56) References Cited

U.S. PATENT DOCUMENTS

2010/0316894 A1* 12/2010 Hermann ............ H01M 2/1241
429/56
2017/0373303 A1* 12/2017 Ito .......................... H01G 11/74

FOREIGN PATENT DOCUMENTS

JP 2015-144095 A 8/2015

* cited by examiner

*Primary Examiner* — Haroon S. Sheikh
(74) *Attorney, Agent, or Firm* — Dinsmore & Shohl LLP

(57) ABSTRACT

A sealed battery includes a battery outer case, a collector terminal, an outwardly exposed terminal, and a current shut-off mechanism configured to cut off a conductive path from the collector terminal to the outwardly exposed terminal when the internal pressure of the battery outer case exceeds a predetermined pressure. The current shut-off mechanism includes a connection plate with a vent hole, and a shut-off valve including a reversing portion. A joint region in the connection plate is in contact with a surface, of the reversing portion, that faces the inner side of the battery outer case. A thermal-spray joint portion configured to cover a border between the joint region and the reversing portion is provided, such that the shut-off valve is joined to the connection plate via the thermal-spray joint portion.

14 Claims, 4 Drawing Sheets

SEALED BATTERY AND MANUFACTURING METHOD OF SEALED BATTERY

CROSS-REFERENCE TO RELATED APPLICATIONS

This application claims priority to Japanese Patent Application No. 2017-172556 filed on Sep. 7, 2017, which is incorporated herein by reference in its entirety including the specification, drawings and abstract.

BACKGROUND

1. Technical Field

The disclosure relates to a sealed battery. More specifically, the disclosure relates to a sealed battery including a current shut-off mechanism that operates due to an increase in internal pressure, and a manufacturing method of the sealed battery.

2. Description of Related Art

Secondary batteries such as a lithium-ion secondary battery and a nickel hydrogen battery become more important as a vehicle-mounted power supply or a power supply for a PC or a portable terminal. For example, the secondary batteries are formed as a so-called sealed battery configured such that an electrode body and an electrolyte are accommodated in a sealed battery outer case. The battery outer case for such a sealed battery is provided with an electrode terminal that electrically connects the electrode body in the battery outer case to an external device such as another secondary battery or a motor.

In the sealed battery of this kind, an excessive current might flow into the electrode body, i.e., so-called overcharge might occur, during charging due to a failure or the like of a charging device. When such overcharge occurs, cell reaction progresses rapidly and a large amount of gas is generated in the battery outer case, so that the battery outer case might be damaged due to an increase in internal pressure. In order to prevent the progress of such overcharge, the sealed battery is provided with a mechanism (a current shut-off mechanism) configured to cut off a conductive path from the electrode body to the electrode terminal at the time when the internal pressure of the battery outer case increases.

An example of the sealed battery provided with the current shut-off mechanism includes a sealed battery 100 as illustrated in FIG. 7. The sealed battery 100 includes a collector terminal 110 electrically connected to an electrode body (not shown) in a battery outer case 150, and an outwardly exposed terminal 120 electrically connected to the collector terminal 110 and partially exposed outside the battery outer case 150. The sealed battery 100 is configured such that a current shut-off mechanism S is placed between the collector terminal 110 and the outwardly exposed terminal 120. The current shut-off mechanisms S includes: a connection plate 112 formed in the upper end of the collector terminal 110; a spacer 130 that is a plate-shaped insulating member placed on the connection plate 112; and a plate-shaped shut-off valve 140 placed on the spacer 130. A reversing portion 142 curved downward in a dome shape is formed in the shut-off valve 140, and the reversing portion 142 makes contact with a region (a joint region 116) around a vent hole 114 of the connection plate 112 through an opening 136 of the spacer 130. As illustrated in FIG. 8, a part where the reversing portion 142 of the shut-off valve 140 makes contact with the joint region 116 of the connection plate 112 is irradiated with a laser beam L. Hereby, the melted shut-off valve 140 and the melted connection plate 112 are mixed with each other so that a welded joint portion 145 is formed. Thus, the shut-off valve 140 is joined to the connection plate 112 via the welded joint portion 145.

When overcharge occurs in the sealed battery 100 configured as such, the reversing portion 142 of the shut-off valve 140 is reversed upward due to an increase in internal pressure in the battery outer case 150, so that the connection plate 112 breaks at a part where a breakage groove 118 is formed. Hereby, electrical connection between the collector terminal 110 and the outwardly exposed terminal 120 is cut off, so that progress of the overcharge can be prevented. Japanese Unexamined Patent Application Publication No. 2015-144095 (JP 2015-144095 A) discloses an example of a sealed battery including a current shut-off mechanism having such a structure.

SUMMARY

However, in the sealed battery including the current shut-off mechanism, the pressure (working pressure of the current shut-off mechanism S) that reverses the shut-off valve 140 is not stable, so that the conductive path might not be shut off at an appropriate timing.

More specifically, in the sealed battery 100, while the laser beam L is applied, the shut-off valve 140 and the connection plate 112 may be heated up to a very high temperature (around 600°). Since the reversing portion 142 of the shut-off valve 140 is formed to be thinner (a thickness of around 0.3 mm) than other parts in consideration of the reversing pressure, heat strain to deform the reversing portion 142 to be warped upward might occur due to heat during the application of the laser beam L. In the reversing portion 142 where heat strain has occurred, the reversing pressure greatly decreases, so that the current shut-off mechanism might be operated at a pressure lower than a pressure intended at the time of design.

Further, adjustment of conditions such as laser output is very difficult, and if the output is too strong, the laser beam L may penetrate through the connection plate 112 and the shut-off valve 140. In such a case, a through-hole might be formed in the welded joint portion 145 that has been formed and gas inside the battery outer case 150 might come out through the through-hole. In this case, although overcharge progresses and a sufficient amount of gas is generated, the reversing portion 142 is not reversed, thereby resulting in that the conductive path cannot be shut off at an appropriate timing.

Further, when laser welding is performed in the state where the connection plate 112 and the shut-off valve 140 are not positioned appropriately, the welded joint portion 145 is not formed appropriately so that a gap (clearance) might be formed between the joint region 116 and the reversing portion 142. In such a case, gas might also come out through the gap where the welded joint portion 145 is not formed, so that the conductive path cannot be shut off at an appropriate timing.

The disclosure provides a sealed battery including a current shut-off mechanism configured such that a connection plate and a shut-off valve are joined to each other appropriately and the shut-off valve can be reversed stably at a desired pressure.

According to the disclosure, a sealed battery having the following configuration is provided.

A sealed battery according to a first aspect of the disclosure includes a battery outer case, a collector terminal, an outwardly exposed terminal, and a current shut-off mechanism. The battery outer case is configured such that an electrode body is accommodated therein. The collector terminal is electrically connected to the electrode body in the battery outer case. The outwardly exposed terminal is electrically connected to the collector terminal inside the battery outer case and partially exposed outside the battery outer case. The current shut-off mechanism is placed on a conductive path from the collector terminal to the outwardly exposed terminal and configured to cut off the conductive path when an internal pressure of the battery outer case exceeds a predetermined pressure. The current shut-off mechanism includes a connection plate as a plate-shaped conductive member provided in one end of the collector terminal, the connection plate with a vent hole provided in a central part of the connection plate, and a shut-off valve including a reversing portion electrically connected to the outwardly exposed terminal. In the sealed battery, a joint region is in a peripheral portion in the connection plate, the peripheral portion defining the vent hole of the connection plate. The joint region is in contact with a surface of the reversing portion, the surface facing the inner side of the battery outer case. A thermal-spray joint portion is provided so as to cover a border between the joint region and the reversing portion. The shut-off valve is joined to the connection plate via the thermal-spray joint portion.

In order to solve the various problems described above, the inventors considered using a new technique different from laser welding for joining a shut-off valve and a connection plate. However, even in the case of using general joint techniques (resistance joint, friction joint, contact bonding, and the like) other than laser welding, problems such as distortion, breakage, poor joint, and the like of the shut-off valve might occur.

In view of this, the inventors examined that the shut-off valve and the connection plate were joined to each other by use of a technique that was not used for normal joint. As a result of various experiments and examinations, the inventors conceived of using a thermal spray technique in which a melted metallic material is discharged so that the metallic material is attached to a target, at the time of joining the shut-off valve to the connection plate.

More specifically, the thermal spray technique used for the sealed battery described herein is a technique used to form coating on a surface of an object. Since the strength of the coating to be formed is low, the thermal spray technique was not used for joint between general metal members. However, in a current shut-off mechanism of a sealed battery, joint between a shut-off valve and a connection plate should be maintained until a reversing portion of the shut-off valve is reversed, and therefore, the inventors considered that it was not necessary to perform strong joint, such as laser welding, that integrates the shut-off valve and the connection plate. As a result of various experiments and examinations based on such findings, the inventors found that the thermal spray technique for attaching a melted metallic material was usable at the time of joining the shut-off valve and the connection plate in the sealed battery. In the case of using such a thermal spray technique, the shut-off valve and the connection plate can be joined to each other at a very low temperature (200° C. or less) in comparison with laser welding. Thus, it was found that various problems such as heat strain of the shut-off valve and formation of a through-hole can be prevented appropriately.

The sealed battery described herein has been accomplished based on the findings, and the thermal-spray joint portion is formed so as to cover the border between the shut-off valve and the connection plate, so that the shut-off valve is joined to the connection plate via the thermal-spray joint portion. Differently from a welded joint portion (see the reference sign 145 in FIG. 8 in which the shut-off valve is integrated with the connection plate by laser welding, the thermal-spray joint portion is formed such that a metallic material is sprayed so as to cover the shut-off valve and the connection plate. As described above, since such a thermal-spray joint portion can be formed at a very low temperature in comparison with the welded joint portion formed by laser welding, it is possible to appropriately prevent the reversing pressure of the shut-off valve from being decreased due to heat strain. Further, differently from laser welding, the technique used herein is not a technique that melts the shut-off valve and the connection plate by heat, so that a through-hole is not formed in a joint part therebetween. Further, since the thermal-spray joint portion is formed by attaching a metallic material, it is possible to fill a gap between the shut-off valve and the connection plate even if joining is performed in the state where the shut-off valve and the connection plate are not positioned appropriately. As described above, according to the sealed battery described herein, it is possible to appropriately prevent various problems to be caused in the case of laser welding, thereby making it possible to join the connection plate and the shut-off valve to each other appropriately and to reverse the shut-off valve stably at a desired pressure.

In the first aspect, the reversing portion may include a dome-shaped concave portion that is concaved toward the inner side of the battery outer case.

In the first aspect, the joint region may be configured such that a thickness of the connection plate is thinner in a tapered shape toward the vent hole. When the joint region in the tapered shape is formed as such, it is possible to sufficiently secure a contact area between the connection plate and the thermal-spray joint portion and to appropriately bond the thermal-spray joint, portion to the connection plate. Hereby, it is possible to more firmly join the reversing portion to the connection plate.

In the first aspect, a tip end of the connection plate in the joint region may define the vent hole, and an angle of the tip end may be between 20° and 40°. Like the above aspect, in the case where the joint region of the connection plate is formed in the tapered shape, the angle of the tip end of the joint region may be adjusted appropriately. For example, when the angle of the tip end of the joint region in the tapered shape is made too small, the strength of the tip end of the joint region might be decreased and damaged. In the meantime, when the angle is made too large, the contact area between the connection plate and the thermal-spray joint portion might become small. In consideration of this, the angle of the tip end of the joint region may be from 20° to 40°, and may be set to about 30°, for example.

In the first aspect, the thermal-spray joint portion may be made of the same metallic material as the connection plate and the shut-off valve. This allows the sprayed metallic material to be attached to the joint region and the reversing portion appropriately, thereby making it possible to join the reversing portion to the connection plate with an appropriate strength.

In the first aspect, the thermal-spray joint portion may be made of aluminum or aluminum alloy. As described above, the thermal-spray joint portion may be made of the same metallic material as the connection plate and the shut-off valve. For example, on the positive side of the sealed battery, an aluminum conductive member may be used for the conductive path from the electrode body to the electrode terminal. On this account, in order to appropriately join the connection plate and the shut-off valve provided on the positive side, aluminum or aluminum alloy for the thermal-spray joint portion may be used.

In the first aspect, a thickness of the thermal-spray joint portion may be between 0.1 mm to 1.0 mm. When the thickness of the thermal-spray joint portion is too thin, the joining strength between the connection plate and the shut-off valve might be decreased. In the meantime, even if the thermal-spray joint portion is made too thick, the effect is saturated at a point where the thickness exceeds a given thickness, so that manufacture efficiency just decreases. In consideration of this, the thickness of the thermal-spray joint portion may be set within a range from 0.1 mm to 1.0 mm (e.g., 0.5 mm). Note that "the thickness of the thermal-spray joint portion" in the present specification indicates a largest value (a maximum thickness) among measurement results at a plurality of measurement points where the thickness (see the reference sign T in FIG. 3) of the thermal-spray joint portion from the surface of the reversing portion is measured.

In the first aspect, the thermal-spray joint portion may be an annular shape so as to cover the whole circumference of the peripheral portion.

In the first aspect, the joint region may be perpendicular to the surface.

Further, as a second aspect of the disclosure, a manufacturing method of a sealed battery with the following configuration (hereinafter just referred to as the "manufacturing method") will be provided.

The manufacturing method according to the second aspect includes: bringing a joint region formed in a peripheral portion defining a vent hole of a connection plate of the sealed battery into contact with a surface of a reversing portion of a shut-off valve of the sealed battery, the surface facing an inner side of a battery outer case in which an electrode body is accommodated; and forming a thermal-spray joint portion such that a metallic material is sprayed so as to cover a border between the joint region and the reversing portion. The sealed battery includes: a collector terminal electrically connected to the electrode body inside the battery outer case; an outwardly exposed terminal electrically connected to the collector terminal inside the battery outer case and partially exposed outside the battery outer case; and a current shut-off mechanism placed on a conductive path from the collector terminal to the outwardly exposed terminal and configured to cut off the conductive path when an internal pressure of the battery outer case exceeds a predetermined pressure. The current shut-off mechanism includes the connection plate as a plate-shaped conductive member provided in one end of the collector terminal, the connection plate with the vent hole provided in a central part of the connection plate, and the shut-off valve including the reversing portion electrically connected to the outwardly exposed terminal.

The manufacturing method described herein is a method for manufacturing the sealed battery of the above aspect. In the manufacturing method, the metallic material is sprayed so as to cover the border between the joint region and the reversing portion in the state where the joint region of the connection plate makes contact with the reversing portion of the shut-off valve. When the thermal-spray joint portion is formed by use of the thermal spray technique as such, the shut-off valve can be joined to the connection plate appropriately without performing laser welding, thereby making it possible to appropriately prevent various problems to be caused in the case of laser welding. Accordingly, with the manufacturing method described herein, it is possible to appropriately form the current shut-off mechanism configured such that the connection plate and the shut-off valve are joined to each other appropriately and the shut-off valve can be reversed stably at a desired pressure.

In the second aspect, the reversing portion may include a dome-shaped concave portion that is concaved toward the inner side of the battery outer case.

In the second aspect, when the metallic material is sprayed to the border between the joint region and the reversing portion, any one of plasma spraying, flame spraying, electric arc spraying, and cold spray may be used. When the thermal-spray joint portion is formed by use of such a thermal spray technique, it is possible to join the shut-off valve and the connection plate with a sufficient strength, without causing problems such as occurrence of heat strain and formation of a through-hole. Note that among the thermal spray techniques, plasma-spraying, may be because the thermal-spray joint portion having a sufficient strength can be formed particularly at a lower temperature (100° C. to 150° C., e.g., 120° C.).

In the second aspect, when the metallic material is sprayed, a distance from a tip end of a thermal-spray nozzle that sprays the metallic material to the border may be from 250 mm to 350 mm. In a general thermal spray technique, a thermal-spray nozzle configured to discharge a melted metallic material is used. At this time, if a distance (a spray distance) between the tip end of the thermal-spray nozzle and a thermal-spray target (the border between the joint region and the reversing portion) is too short, the thermal-spray target might be damaged by the discharged metallic material. In the meantime, if the spray distance is too long, it is difficult to efficiently form the thermal-spray joint portion with a sufficient thickness. In consideration of this, the spray distance at the time of forming the thermal-spray joint portion may be set within a range from 250 mm to 350 mm (e.g., 300 mm).

In the second aspect, when the metallic material is sprayed, the thermal-spray joint portion may be formed at 200° C. or less.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
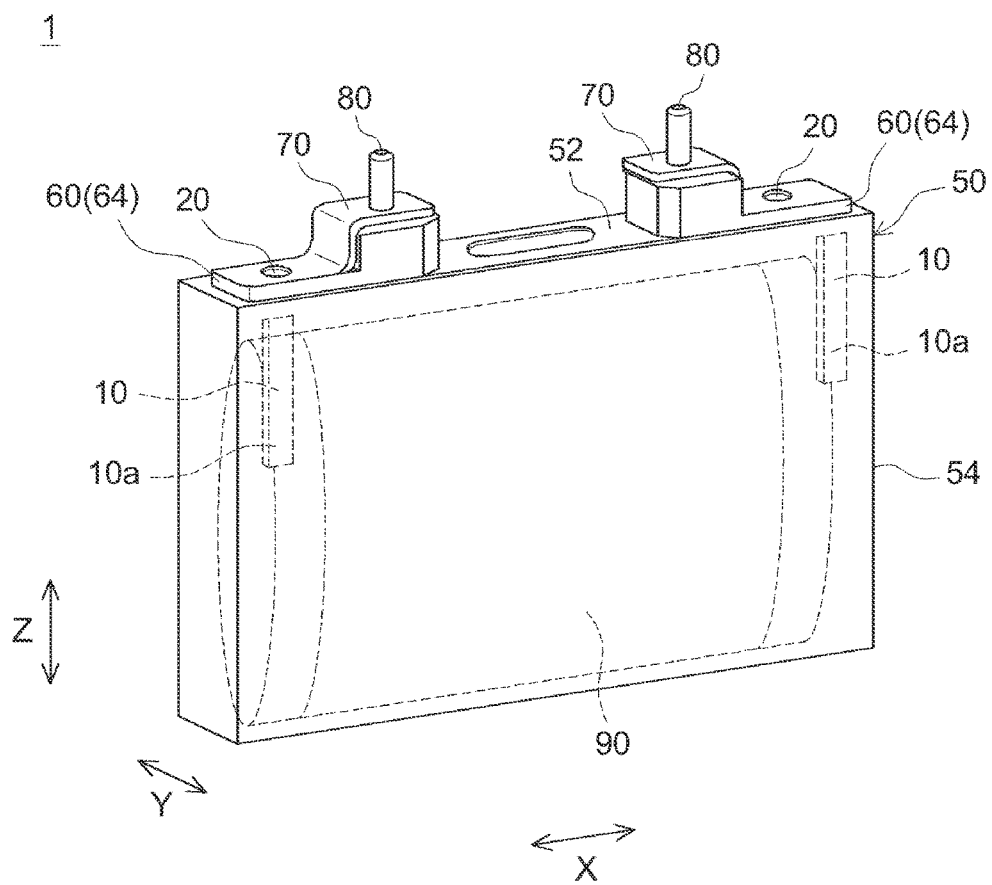
FIG. 1 is a perspective view schematically illustrating a sealed battery according to one embodiment of the disclosure.

The following describes a sealed battery according to one embodiment of the disclosure. In the drawings to be described below, the same reference sign is assigned to members/parts that yield the same effect. Note that a dimensional relationship (length, width, thickness, and the like) in each drawing does not show an actual dimensional relationship. Further, a matter that is not particularly mentioned in the present specification but is necessary for execution of the disclosure (e.g., configurations, manufacturing methods, and the like of an electrode body and an electrolyte) can be understood as a design matter of a person skilled in the art based on conventional techniques in the related art.

1. Overall Configuration of Sealed Battery

Figure 2:
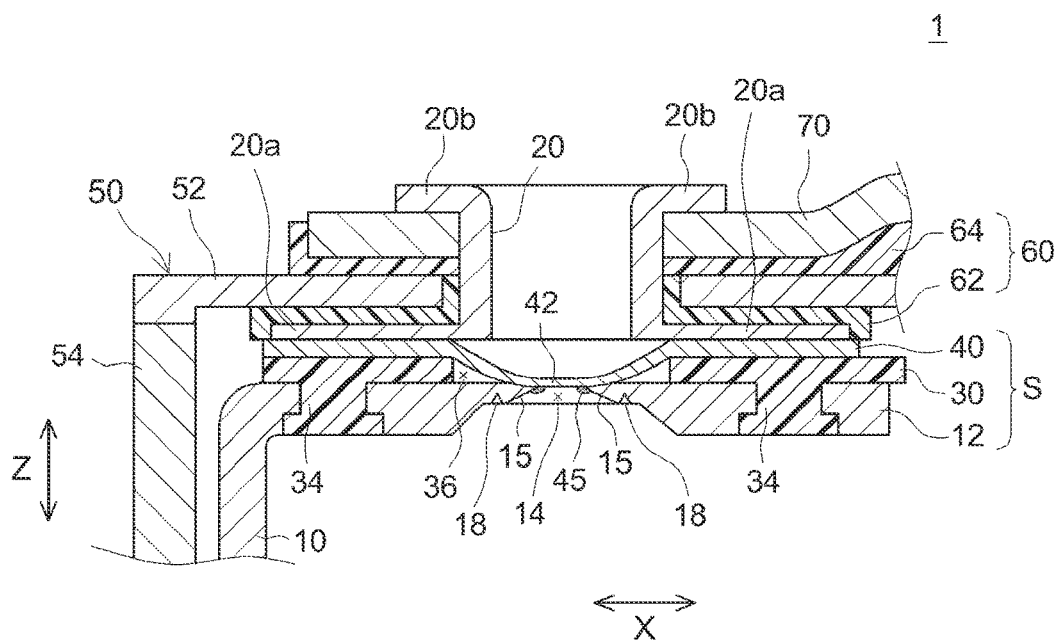
FIG. 2 is a sectional view schematically illustrating the vicinity of a current shut-off mechanism in the sealed battery according to one embodiment of the disclosure.
Figure 3:
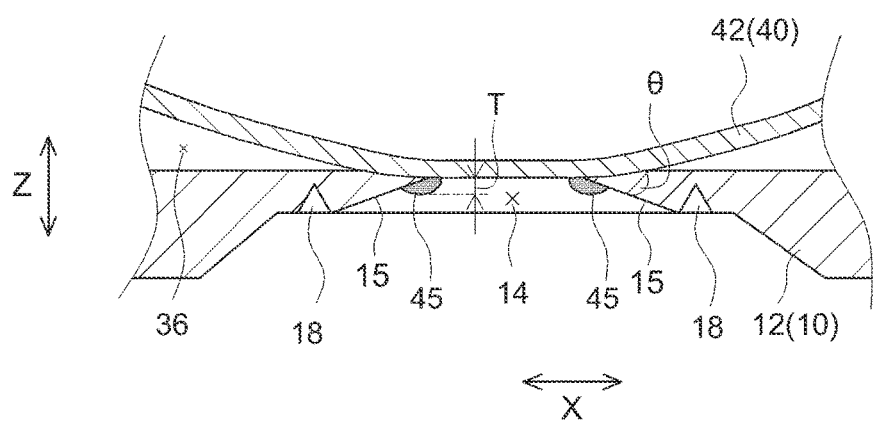
FIG. 3 is an enlarged sectional view schematically illustrating the vicinity of a reversing portion of the shut-off valve illustrated in FIG. 2.
Figure 4:
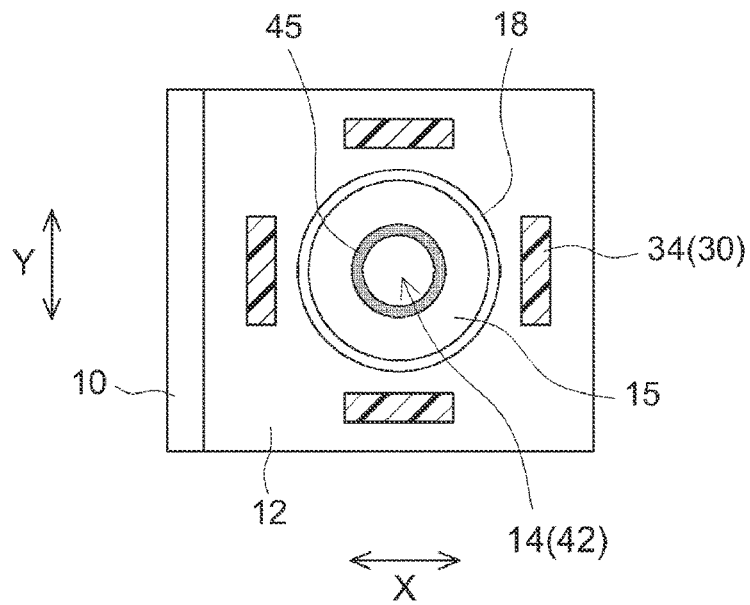
FIG. 4 is a bottom plan view schematically illustrating the current shut-off mechanism of the sealed battery according to one embodiment of the disclosure.

FIG. 1 is a perspective view schematically illustrating a sealed battery according to the present embodiment, and FIG. 2 is a sectional view schematically illustrating the vicinity of a current shut-off mechanism in the sealed battery according to the present embodiment. Further, FIG. 3 is an enlarged sectional view schematically illustrating the vicinity of a reversing portion of a shut-off valve illustrated in FIG. 2, and FIG. 4 is a bottom view schematically illustrating the current shut-off mechanism of the sealed battery according to the present embodiment. Note that, in FIGS. 1 to 4, a reference sign X indicates a lengthwise direction of a sealed battery 1, a reference sign Y indicates a depthwise direction, and a reference sign Z indicates a height direction.

As illustrated in FIG. 1, the sealed battery 1 includes a battery outer case 50 having a flat square shape. The battery outer case 50 includes a square-shaped case main body 54 opened on its top surface, and a cover 52 configured to close the opening on the top surface of the case main body 54. Note that a metallic material such as aluminum or a resin material, for example, can be used for components constituting the battery outer case 50.

An electrode body 90 and an electrolyte (not shown) are accommodated in the battery outer case 50. The electrode body 90 illustrated in FIG. 1 is a wound electrode body configured such that a laminated body obtained by laminating a positive electrode sheet and a negative electrode sheet via a separator is wound. Note that the same structures and materials as general sealed batteries in the related art can be employed without any limitation as the structure and the material of the electrode body, and the present disclosure is not characterized thereby. In view of this, detailed descriptions of the structure and the material of the electrode body are omitted herein. Further, materials used for electrolytes of general sealed batteries in the related art can be also used without any limitation as the electrolyte.

Further, an electrode terminal 80 is provided in the cover 52 serving as the top face of the battery outer case 50. The electrode terminal 80 is a columnar conductive member and is configured to be connected to an external device such as another secondary battery, a motor for a vehicle, and a charging device.

2. Conductive Path

In the sealed battery 1 according to the present embodiment, the electrode terminal 80 exposed outside the battery outer case 50 is electrically connected to the electrode body 90 accommodated inside the battery outer case 50. Next will be described the conductive path from the electrode body 90 to the electrode terminal 80 in the sealed battery 1 according to the present embodiment.

In the sealed battery 1 according to the present embodiment, in order to form the conductive path from the electrode body 90 to the electrode terminal 80, a collector terminal 10, a shut-off valve 40 (see FIG. 2), an outwardly exposed terminal 20, and an external connection terminal 70 are used. Further, in the sealed battery 1 according to the present embodiment, a spacer 30 and an insulating member 60 are used so that desired members are insulated at an appropriate position. The following describes members constituting the conductive path in the present embodiment.

(1) Collector Terminal

As illustrated in FIG. 1, the collector terminal 10 is a conductive member electrically connected to the electrode body 90 inside the battery outer case 50. More specifically, the collector terminal 10 is a long plate-shaped member extending in the height direction Z, and a lower end 10a is connected to the electrode body 90. In the meantime, as illustrated in FIG. 2, a connection plate 12 that is a plate-shaped conductive member is formed in the upper end of the collector terminal 10. The connection plate 12 is formed, for example, by bending the upper end of the plate-shaped collector terminal 10 in the lengthwise direction X. As illustrated in FIGS. 2 to 4, a circular vent hole 14 is formed in a central part of the connection plate 12. Although details will be described later, a joint region 15 is provided around the vent hole 14, and a reversing portion 42 of the shut-off valve 40 is joined to the joint region 15. In the present embodiment, the joint region 15 of the connection plate 12 is formed in a tapered shape so that its thickness is thinner toward the vent hole 14. Note that an angle θ (see FIG. 3) of the tip end of the joint region 15 in the tapered shape may be between 20° and 40°, and is set to 30°, for example. Further, a breakage groove 18 is formed, around the vent hole 14, on the bottom face of the connection plate 12. As illustrated in FIG. 4, the breakage groove 18 is formed continuously in an annular shape so as to surround the vent hole 14. A part where the breakage groove 18 is formed has a thickness (from 0.01 mm to 0.1 mm, e.g., around 0.04 mm) thinner than the other parts of the connection plate 12 and can be easily broken when a predetermined pressure is applied thereto.

(2) Spacer

As illustrated in FIG. 2, the spacer 30 is a plate-shaped insulating member placed on the top face of the connection plate 12 of the collector terminal 10 and is made of insulating resin such as polyamide resin, for example. An opening 36 having a diameter larger than the vent hole 14 of the connection plate 12 is formed in a central part of the spacer 30. Further, a fastening projection 34 penetrating through the connection plate 12 of the collector terminal 10 is formed in the spacer 30. The lower end of the fastening projection 34 is deformed by thermal caulking, so that the spacer 30 is hereby fixed to the connection plate 12.

(3) Shut-Off Valve

The shut-off valve 40 is a plate-shaped conductive member placed on the spacer 30. In the sealed battery 1 according to the present embodiment, the collector terminal 10 (the connection plate 12) and the outwardly exposed terminal 20 are connected electrically to each other via the shut-off valve 40. More specifically, the reversing portion 42 curved downward in a dome shape is formed in a central part of the shut-off valve 40. Here, "downward" indicates a direction from the outside to the inside. In other words, the reversing portion 42 includes a dome-shaped concave portion that is concaved toward the inner side of the battery outer case. The reversing portion 42 in the dome shape makes contact with a peripheral portion (the joint region 15) around the vent hole 14 of the connection plate 12 through the opening 36 of the spacer 30. The peripheral portion indicates a peripheral portion, in the connection plate, that defines the vent hole. Although details will be described later, as illustrated in FIGS. 3 and 4, in the sealed battery 1 according to the present embodiment, a thermal-spray joint portion 45 is formed so as to cover a border between the reversing portion 42 and the joint region 15, and the shut-off valve 40 is joined to the connection plate 12 via the thermal-spray joint portion 45.

(4) Outwardly Exposed Terminal

As illustrated in FIG. 2, the outwardly exposed terminal 20 is a tubular conductive member configured such that a disciform conductive plate 20a is attached to a lower end thereof. The conductive plate 20a of the outwardly exposed terminal 20 is joined to the top face of the peripheral portion of the shut-off valve 40. In the meantime, a tubular portion of the outwardly exposed terminal 20 penetrates through the cover 52 so as to be exposed outside the battery outer case 50. An upper end 20b of the tubular portion is bent radially outwardly by caulking, so that an insulating member 60 (described later) and the external connection terminal 70 are fixed to the cover 52.

(5) External Connection Terminal

As illustrated in FIG. 1, the external connection terminal 70 is a plate-shaped conductive member extending along the lengthwise direction X of the sealed battery 1. The outwardly exposed terminal 20 is passed through a first end of the external connection terminal 70, and the electrode terminal 80 is passed through a second end thereof. The outwardly exposed terminal 20 and the electrode terminal 80 are electrically connected to each other via the external connection terminal 70. As described above, in the sealed battery 1 according to the present embodiment, the conductive path from the electrode body 90 to the electrode terminal 80 is formed by the collector terminal 10 the shut-off valve 40 (see FIG. 2), the outwardly exposed terminal 20, and the external connection terminal 70.

(6) Insulating Member

Further, as illustrated in FIG. 2, in the present embodiment, the insulating member 60 is provided so as to prevent the conductive members (the outwardly exposed terminal 20, the external connection terminal 70, the electrode terminal 80, and the like) constituting the conductive path from being conductive with the cover 52. The insulating member 60 is made of polyamide resin and includes a sealing member 62 and an insulating holder 64. The sealing member 62 is placed on the lower side of the cover 52 and prevents the outwardly exposed terminal 20 from being conductive with the cover 52. In the meantime, as illustrated in FIG. 1, the insulating holder 64 is put on the top face of the cover 52 and prevents the external connection terminal 70 and the electrode terminal 80 from being conductive with the cover 52.

3. Current Shut-Off Mechanism

The sealed battery 1 according to the present embodiment is provided with the current, shut-off mechanism S. The current shut-off mechanism S is placed on the conductive path from the collector terminal 10 to the outwardly exposed terminal 20. When the internal pressure of the battery outer case 50 exceeds a predetermined pressure, the conductive path is cut off.

More specifically, the current shut-off mechanism S according to the present embodiment is constituted by the connection plate 12 of the collector terminal 10, the spacer 30, and the shut-off valve 40 among the members described above. When the reversing portion 42 of the shut-off-valve 40 curved downward is joined to the joint region 15 of the connection plate 12, the shut-off valve 40 and the collector terminal 10 are electrically connected to each other. In the sealed battery 1 including the current shut-off mechanism S, when the internal pressure of the battery outer case 50 is increased by gas generated at the time of overcharge, the reversing portion 42 curved downward is reversed upward in the height direction Z. Hereby, the connection plate 12 breaks at a part where the breakage groove 18 is formed, so that the shut-off valve 40 is separated from the connection plate 12, thereby resulting in that electrical connection between the shut-off valve 40 and the collector terminal 10 is cut off.

Here, in the sealed battery 1 according to the present embodiment, the shut-off valve 40 is joined to the connection plate 12 via the thermal-spray joint portion 45, as illustrated in FIG. 3. That is, in the present embodiment, the bottom face (a surface, of the reversing portion, that faces the inner side of the battery outer case) of the reversing portion 42 of the shut-off valve 40 makes contact with the top face of the joint region 15 of the connection plate 12, and the thermal-spray joint portion 45 is formed so as to cover the border between the joint region 15 of the connection plate 12 and the reversing portion 42 of the shut-off valve 40. More specifically, in the sealed battery 1 according to the present embodiment, the joint region 15 of the connection plate 12 is formed so that its thickness is thinner in a tapered shape toward the vent hole 14, and the bottom face of the joint region 15 is inclined. The thermal-spray joint portion 45 is formed so as to cover the bottom face of the joint region 15 in the tapered shape and the bottom face of the reversing portion 42 of the shot-off valve 40. Further, as illustrated in FIG. 4, the thermal-spray joint portion 45 is formed continuously in an annular shape so as to cover the whole circumference of the outer peripheral edge (the joint region 15) of the vent hole 14. Hereby; the shut-off valve 40 is joined to the connection plate 12 via the thermal-spray joint portion 45.

Figure 5:
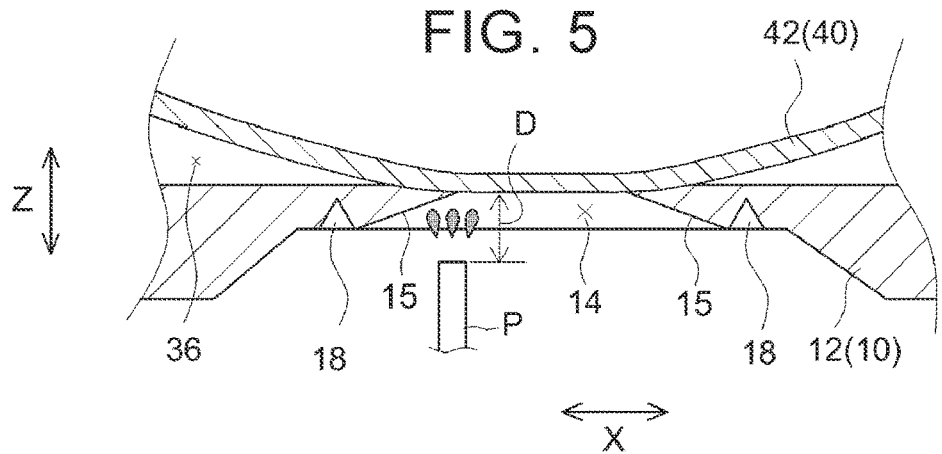
FIG. 5 is an enlarged sectional view to describe a step of forming a thermal-spray joint portion in manufacture of the sealed battery according to one embodiment of the disclosure.

Next will be described the procedure to form the thermal-spray joint portion 45. FIG. 5 is an enlarged sectional view to describe a step of forming the thermal-spray joint portion in manufacture of the sealed battery according to the present embodiment. Herein, the top face of the joint region 15 of the connection plate 12 is brought into contact with the bottom face of the reversing portion 42 of the shut-off valve 40. More specifically, the shut-off valve 40 and the connection plate 12 are positioned so that the reversing portion 42 curved downward makes contact with the top face of the joint region 15 of the connection plate 12 through the opening 36 of the spacer 30.

Then, the thermal-spray joint portion 45 is formed such that a metallic material is sprayed so as to cover the border between the joint region 15 and the reversing portion 42. For example, when the metallic material is sprayed by use of plasma spraying, a plasma spraying device (not shown) including a thermal-spray nozzle P as illustrated in FIG. 5 is used. Herein, the thermal-spray nozzle P is first placed so as to face the border between the reversing portion and the joint region 15. In this state, plasma is caused inside the plasma spraying device and powder of the metallic material is supplied into the plasma spraying device, so that the powder of the metallic material is melted. The metallic material thus melted is discharged from the thermal-spray nozzle P so as to be attached to the border between the reversing portion 42 and the joint region 15. Hereby, the thermal-spray joint portion 45 is formed so as to cover the border between the reversing portion 42 and the joint region 15, so that the connection plate 12 is joined to the shut-off valve 40 via the thermal-spray joint portion 45.

As such, in the sealed battery 1 according to the present embodiment, the shut-off valve 40 is joined to the connection plate 12 via the thermal-spray joint portion 45 formed so as to cover the reversing portion 42 and the joint region 15. Differently from the welded joint portion 145 (see FIG. 8) formed by laser welding in the related art, the thermal-spray joint portion 45 is formed at a very low temperature (200° C. or less), thereby making it possible to appropriately prevent the reversing pressure from being decreased due to heat strain caused in the reversing portion 42 of the shut-off valve 40. Further, differently from the related art in which the welded joint portion 145 is formed by laser welding, the shut-off valve 40 and the connection plate 12 are not melted, so that no through-hole is formed in a joint part therebetween. On this account, it is possible to prevent such a situation that gas generated by overcharge comes out through a through-hole and the current shut-off mechanism does not operate at an appropriate timing. Further, in the present embodiment, the metallic material is attached to the border between the shut-off valve 40 and the connection plate 12 by use of the thermal spray technique. On this account, even if a small gap has occurred between, the reversing portion 42 of the shut-off valve 40 and the joint region 15 of the connection plate 12, the thermal-spray joint portion 45 can be formed so as to fill such a gap. This makes it possible to prevent such a situation that gas comes out through the gap between the reversing portion 42 and the joint region 15 and the current shut-off mechanism does not operate at an appropriate timing. As described above, in the present embodiment, the connection plate 12 and the shut-off valve 40 can be joined to each other appropriately without applying excessive heat to the shut-off valve 40, thereby making it possible to form the current shut-off mechanism S that can reverse the shut-off valve 40 stably at a desired pressure.

Further, in the related art using laser welding, sparks might be caused during laser irradiation and conductive foreign matter might spread, so that the foreign matter might be mixed in the battery outer case. This might greatly reduce battery performance. In contrast, in the present embodiment, sparks like laser welding are not caused, so that it is possible to appropriately prevent spreading of conductive foreign matter and mixing thereof into the battery outer case. Note that the metallic material is sprayed in the present embodiment. However, the metallic material can be appropriately attached to a part (a target position) at which the thermal-spray nozzle is aimed. Accordingly, differently from laser welding in which conductive foreign matter spreads, there hardly occurs such a concern that conductive foreign matter is mixed into the battery outer case.

Note that the thermal-spray joint portion 45 in the present embodiment may be made of the same metallic material as the connection plate 12 and the shut-off valve 40. When the thermal-spray joint portion 45 is made of the same metallic material as such, corresponding members are attached to each other appropriately, so that the connection plate 12 and the shut-off valve 40 can be joined to each other firmly. For example, in a case where the current shut-off mechanism S is provided on the positive electrode side, the connection plate 12 and the shut-off valve 40 made of aluminum may be used. Accordingly, aluminum (or aluminum alloy) for the thermal-spray joint portion 45 may be used.

Further, the thickness T of the thermal-spray joint portion 45 may be set within a range from 0.1 mm to 1.0 mm, and the thickness T is set to 0.5 mm, for example. By setting the thickness T of the thermal-spray joint portion 45 within such a range, the thermal-spray joint portion 45 having an appropriate joining strength can be formed efficiently.

Further, in the case where the thermal-spray joint portion 45 is formed by plasma spraying, a distance (a spray distance D) between a thermal-spray target (the border between the reversing portion 42 and the joint region 15) and the tip end of the thermal-spray nozzle P may be set within a range from 250 mm to 350 mm (e.g., 300 mm). If the spray distance D from the tip end of the thermal-spray nozzle P is too short, the connection plate 12 and the shut-off valve 40 might be damaged by the discharged metallic material. In the meantime, if the spray distance D is too long, it is difficult to quickly form the thermal-spray joint portion 45 with a sufficient thickness, and therefore, manufacture efficiency might decrease.

4. Other Embodiments

The sealed battery according to one embodiment of the disclosure has been described above, but the sealed battery described herein is not limited to the above embodiment and can be variously modified or altered.

Figure 6:
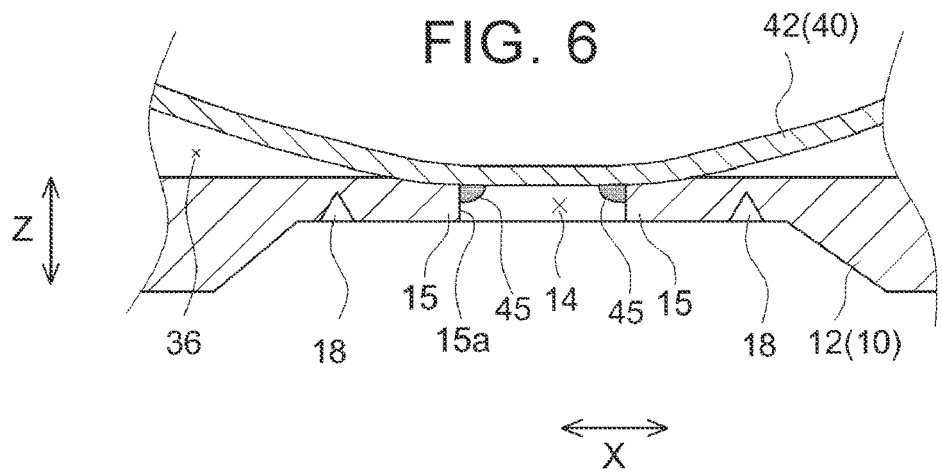
FIG. 6 is an enlarged sectional view schematically illustrating the vicinity of a reversing portion of a shut-off valve in a sealed battery according to another embodiment of the disclosure.

For example, in the above embodiment the joint region 15 in the tapered shape is formed in the connection plate 12 (see FIG. 3). However, the joint region 15 of the connection plate 12 may not necessarily be formed in the tapered shape, and the joint region 15 may have a generally vertical inner peripheral part 15a as illustrated in FIG. 6. Even in this case, the shut-off valve 40 and the connection plate 12 can be joined to each other by forming the thermal-spray joint portion 45 so as to cover the border between the reversing portion 42 of the shut-off valve 40 and the joint region 15 of the connection plate 12. From the viewpoint of securing an appropriate joint area, the shape of the joint region 15 of the connection plate 12 may be the tapered shape as illustrated in FIG. 3.

Further, as illustrated in FIG. 4, in the above embodiment, the annular breakage groove 18 is formed continuously. However, the breakage groove may not necessarily be formed continuously, and a plurality of breakage grooves may be formed such that the breakage grooves are provided at predetermined intervals so as to surround the vent hole of the connection plate. Even in this case, when the reversing portion of the shut-off valve is reversed, the connection plate can be broken at a part where the breakage groove is formed. Further, as long as the shut-off valve can be reversed appropriately according to an increase in internal pressure in the battery outer case, the breakage groove may not necessarily be formed. More specifically, in the sealed battery described herein, the joining strength between the shut-off valve and the connection plate can be adjusted easily by changing the thickness of the thermal-spray joint portion. On this account, the thickness of the thermal-spray joint portion is adjusted such that, when the internal pressure of the battery outer case reaches a desired pressure, the thermal-spray joint portion is separated (or breaks) so as to reverse the reversing portion of the shut-off valve. This makes it possible to operate the current shut-off mechanism at a desired working pressure without forming the breakage groove.

Further, in the above embodiment, the thermal-spray joint portion 45 is formed by use of plasma spraying. However, the technique to form the thermal-spray joint portion 45 is not limited to plasma spraying, and a general thermal spray technique can be used without any limitation in particular. Concrete examples of the thermal spray technique are flame spraying, electric arc spraying, cold spray, and the like. Even with the use of the thermal-spray techniques, the thermal-spray joint portion 45 can be formed appropriately. Among the thermal-spray techniques, plasma spraying may be because the thermal-spray joint portion 45 can be formed by plasma spraying such that the metallic material is sprayed at a lower temperature (100° C. to 150° C., e.g., 120° C.).

TEST EXAMPLES

The following describes test examples related to the disclosure, but, it is not intended to limit the disclosure to the description of the test examples.

A. First Test

In the test, a sealed battery including a current shut-off mechanism manufactured by use of laser welding was compared with a sealed battery including a current shut-off mechanism manufactured by use of plasma spraying. The following describes a specific test content.

1. Assembly of Sealed Battery

Herein, 11 types of sealed batteries (samples 1 to 11) different in how to join a shut-off valve and a connection plate were assembled.

(1) Samples 1 to 10

Figure 7:
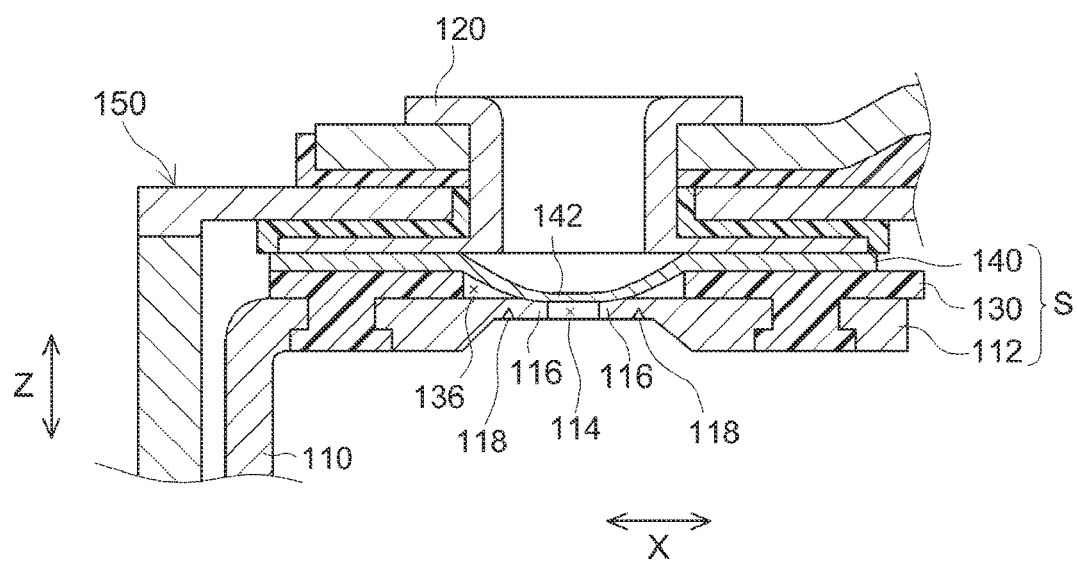
FIG. 7 is a sectional view schematically illustrating the vicinity of a current shut-off mechanism in a sealed battery in the related art.
Figure 8:
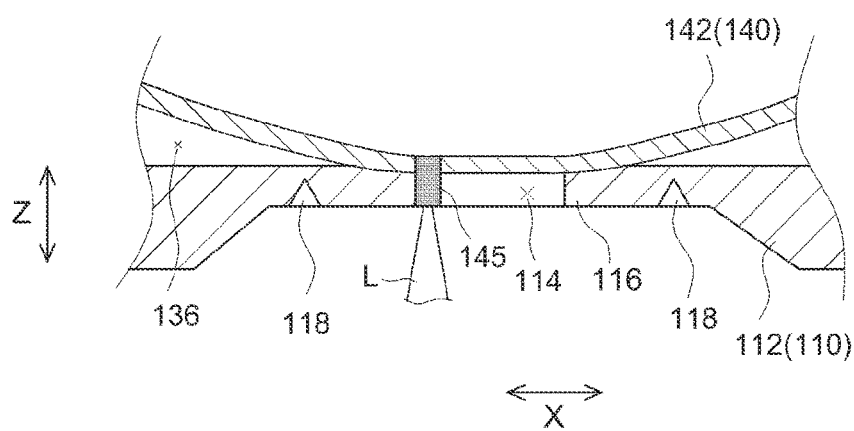
FIG. 8 is an enlarged sectional, view schematically illustrating the vicinity of a reversing portion of a shut-off valve in the sealed battery in the related art.

At the time of assembling the sealed batteries 100 for samples 1 to 10, the welded joint portion 145 was formed by laser welding as illustrated in FIGS. 7 and 8. More specifically, with the use of the shut-off valve 140 including the reversing portion 142 with a thickness of 0.3 mm, the reversing portion 142 of the shut-off valve 140 was brought into contact with a connection plate 112 (thickness: 0.2 mm) of a collector terminal 110. The laser beam L was applied to a contact portion between the reversing portion 142 and the connection plate 112 so as to melt the reversing portion 142 and the connection plate 112, thereby forming the welded joint portion 145. Note that a fiber laser was used for forming the welded joint portion 145, and different laser outputs, different processing times, and different amounts of heat input (see Table 1) were used for respective samples. The shut-off valve 140 used in the test example was designed to reverse the reversing portion 142 at the time when a pressure of 0.9 Mpa was applied thereto.

(2) Sample 11

In sample 11, the sealed battery was manufactured under the same conditions as samples 1 to 10 except that the thermal-spray joint portion 45 was formed by plasma spraying as illustrated in FIGS. 2 to 4. For sample 11, a plasma spraying device (9MC) made by Oerlikon Metco was used. More specifically, aluminum powder (54NS-1) was supplied to the plasma spraying device, and plasma was caused in the device under the conditions of a current of 500 A and a voltage of 78 V, so that the aluminum powder was melted by plasma. Then, an Ar.$H_2$ mixed gas (a flow rate of Ar gas: 175 L/min, a flow rate of $H_2$ gas: 18 L/min) was supplied to the plasma spraying device, and the melted aluminum and the Ar.$H_2$ mixed gas were discharged from the tip end of a thermal-spray nozzle. The aluminum thus discharged was attached to the border between the reversing portion 42 and the joint region 15 in the sealed battery so as to form the thermal-spray joint portion 45. In sample 11, the distance (the spray distance D) from the border between the reversing portion 42 and the joint region 15 to the thermal-spray nozzle was set to 300 mm.

2. Evaluation Test (1) Check of Joined State

A joint part between the shut-off valve and the connection plate in each of the sealed batteries of samples 1 to 11 was cut, and a state of the joint part was observed with an optical microscope. Observation results are shown in Table 1. Note that "PENETRATED" in Table 1 indicates a state where a through-hole was formed in the joint part (the welded joint portion or the thermal-spray joint portion) between the shut-off valve and the connection plate. Further, "UNWELDED" in Table 1 indicates a state where a gap was formed between the shut-off valve and the connection plate.

(2) Measurement of Joint Area

As a result of the check of the joined states as mentioned, earlier, in terms of a sample having a good joined state, five sealed batteries were manufactured. In each of the sealed batteries, the connection plate (the collector terminal) was pulled to break the joint part between the connection plate and the shut-off valve, so that the connection plate and the shut-off valve were separated from each other. Then, a broken part was observed with a microscope so as to measure the area (joint area) of a part where the shut-off valve was joined to the connection plate. As average value of measurement results of joint areas is shown in Table 1.

(3) Evaluation of Reversing Pressure

Similarly to the measurement of joint areas, five sealed batteries were manufactured in terms of a sample having a good joined state. Then, the inner side of the battery outer case of each of the sealed batteries was pressurized, and a pressure at the time when the reversing portion of the shut-off valve was reversed was measured. An average value of measurement results is shown in Table 1.

TABLE 1

| | JOINING MEANS | OUTPUT (kw) | PROCESS TIME (sec.) | AMOUNT OF HEAT INPUT (J) | JOINED STATE | JOINT AREA (mm$^2$) | REVERSING PRESSURE (MPa) |
|---|---|---|---|---|---|---|---|
| SAMPLE 1 | LASER WELDING | 2.0 | 0.005 | 10.0 | PENETRATED | — | — |
| SAMPLE 2 | LASER WELDING | 1.8 | 0.005 | 8.8 | PENETRATED | — | — |
| SAMPLE 3 | LASER WELDING | 1.6 | 0.005 | 8.0 | SUCCESSFULLY WELDED | 0.84 | 0.70 |
| SAMPLE 4 | LASER WELDING | 1.6 | 0.010 | 16.0 | UNWELDED | — | — |
| SAMPLE 5 | LASER WELDING | 1.5 | 0.005 | 7.5 | SUCCESSFULLY WELDED | 0.73 | 0.71 |
| SAMPLE 6 | LASER WELDING | 1.5 | 0.003 | 5.0 | PENETRATED | — | — |
| SAMPLE 7 | LASER WELDING | 1.5 | 0.003 | 3.8 | PENETRATED | — | — |
| SAMPLE 8 | LASER WELDING | 1.4 | 0.005 | 6.9 | UNWELDED | — | — |
| SAMPLE 9 | LASER WELDING | 1.3 | 0.005 | 6.3 | UNWELDED | — | — |
| SAMPLE 10 | LASER WELDING | 1.0 | 0.010 | 10.0 | UNWELDED | — | — |
| SAMPLE 11 | PLASMA SPRAY | — | 0.5 | — | SUCCESSFULLY WELDED | 1.06 | 0.88 |

As shown in Table 1, it is found that, when the shut-off valve to the connection plate by use of laser welding, a through-hole might be formed in the joint part between the connection plate and the shut-off valve or a gap might be formed between the connection plate and the shut-off valve. In the meantime, even in the case of using laser welding, when the conditions such as output were adjusted, relatively successful joining was performed like samples 3, 5. However, in samples 3, 5, the shut-off valve was designed to be reversed at 0.9 MPa, but its reversing pressure was decreased to about 0.7 MPa. This is presumably because heat strain was caused in the reversing portion of the shut-off valve due to heat at the time of laser welding.

In contrast, in sample 11 using plasma spaying, the occurrence of penetration, poor joining, and the like was restrained appropriately. Further, in sample 11, the reversing pressure of the shut-off valve was 0.88 MPa, and thus, a decrease in reversing pressure due to heat strain was restrained appropriately. From this point, it was found that a current shut-off mechanism that operates at a stable pressure could be formed by joining the connection plate to the shut-off valve by use of plasma spraying.

Further, when samples 3, 5, 11 that yielded a successful joined state were compared to each other, a wider joint area was secured in sample 11 than samples 3, 5. As a result, it was found that, in the case where the thermal-spray joint portion was formed by plasma spraying and the connection plate was joined to the shut-off valve via the thermal-spray joint portion, a joint area wider than that in the related art was secured, so that a sufficient joining strength was obtained.

B. Second Test

In the test, plasma spraying was performed with different distances (spray distances D) from the border between the connection plate and the shut-off valve to the thermal-spray nozzle. The following describes a specific test content.

In the test example, three types of sealed batteries (samples 12 to 14) were manufactured as shown in Table 2. In sample 12 among samples 12 to 14, the sealed battery was manufactured under the same conditions as sample 11 in the first test. In samples 13, 14, the sealed batteries were manufactured under the same conditions as sample 12 except that different spray distances D from the thermal-spray nozzle were employed.

In the test, similarly to the first test, the joint part between the shut-off valve and the connection plate in each of the sealed batteries was cut, and a state of the joint part was observed with an optical microscope, so as to check a joined state of each sample. The results are shown in Table 2.

TABLE 2

| | JOINING MEANS | SPRAY DISTANCE (mm) | JOINED STATE |
|---|---|---|---|
| SAMPLE 12 | PLASMA SPRAY | 300 | GOOD |
| SAMPLE 13 | PLASMA SPRAY | 100 | GOOD (WITH SMALL SCRATCH) |
| SAMPLE 14 | PLASMA SPRAY | 450 | GOOD (DECREASE IN EFFICIENCY) |

As shown in Table 2, in any of samples 12 to 14, the connection plate and the shut-off valve were joined to each other appropriately and no heat strain was observed in the reversing portion of the shut-off valve. However, in sample 13, a scratch was observed in the connection plate and the shut-off valve. The scratch was very small and hardly affected the reversing pressure, but a slight decrease in strength was observed in the connection plate and the shut-off valve. This is presumably because the spray distance D from the thermal-spray nozzle was too short. In the meantime, in sample 14, it took some time to form the thermal-spray joint portion with an appropriate thickness. This is presumably because the spray distance D from the thermal-spray nozzle was too long, so that efficiency was decreased at the time of spraying the metallic material. From this point, it was found that the spray distance D from the thermal-spray nozzle may be set to a range from 250 mm to 350 mm (e.g., 300 mm) like sample 12.

Further, in the test, a thermo-label was attached to the shut-off valve in sample 12, so as to examine heat history while the thermal-spray joint portion was formed. As a result, it was confirmed that a maximum temperature of the shut-off valve while the thermal-spray joint portion was formed was 120° C., and the temperature did not reach a high temperature (600° C. or more) like laser welding.

The specific examples of the disclosure have been described based on the embodiment. However, the examples are for illustration only, and do not limit the scope of the claims. Further, the specific examples deal with the reversing portion curved in a dome shape, but the reversing portion may have a shape such as a plane shape. The technique described in the scope of the claims includes various modifications and alteration of the above examples.

What is claimed is:

1. A sealed battery comprising:
   a battery outer case in which an electrode body is accommodated;
   a collector terminal electrically connected to the electrode body inside the battery outer case;
   an outwardly exposed terminal electrically connected to the collector terminal inside the battery outer case and partially exposed outside the battery outer case; and
   a current shut-off mechanism placed on a conductive path from the collector terminal to the outwardly exposed terminal and configured to cut off the conductive path when an internal pressure of the battery outer case exceeds a predetermined pressure, wherein:
   the current shut-off mechanism includes a connection plate as a plate-shaped conductive member provided in one end of the collector terminal, the connection plate with a vent hole provided in a central part of the connection plate, and a shut-off valve including a reversing portion electrically connected to the outwardly exposed terminal;
   a joint region is in a peripheral portion in the connection plate, the peripheral portion defining the vent hole of the connection plate;
   the joint region is in contact with a surface of the reversing portion, the surface facing an inner side of the battery outer case;
   a thermal-spray joint portion is provided so as to cover a border between the joint region and the reversing portion; and
   the shut-off valve is joined to the connection plate via the thermal-spray joint portion.

2. The sealed battery according to claim 1, wherein the reversing portion includes a dome-shaped concave portion that is concaved toward the inner side of the battery outer case.

3. The sealed battery according to claim 1, wherein the joint region is configured such that a thickness of the connection plate is thinner in a tapered shape toward the vent hole.

4. The sealed battery according to claim 3, wherein a tip end of the connection plate in the joint region defines the vent hole, and an angle of the tip end is between 20° and 40°.

5. The sealed battery according to claim 1, wherein the thermal-spray joint portion is made of the same metallic material as the connection plate and the shut-off valve.

6. The sealed battery according to claim 5, wherein the thermal-spray joint portion is made of aluminum or aluminum alloy.

7. The sealed battery according to claim 1, wherein a thickness of the thermal-spray joint portion is between 0.1 mm and 1.0 mm.

8. The sealed battery according to claim 1, wherein the thermal-spray joint portion is an annular shape so as to cover a whole circumference of the peripheral portion.

9. The sealed battery according to claim 1, wherein the joint region is perpendicular to the surface.

10. A manufacturing method of a sealed battery, the manufacturing method comprising:
    bringing a joint region formed in a peripheral portion defining a vent hole of a connection plate of the sealed battery into contact with a surface of a reversing portion of a shut-off valve of the sealed battery, the surface facing an inner side of a battery outer case in which an electrode body is accommodated; and
    forming a thermal-spray joint portion such that a metallic material is sprayed so as to cover a border between the joint region and the reversing portion, wherein:
    the sealed battery includes:
      a collector terminal electrically connected to the electrode body inside the battery outer case;
      an outwardly exposed terminal electrically connected to the collector terminal inside the battery outer case and partially exposed outside the battery outer case; and
      a current shut-off mechanism placed on a conductive path from the collector terminal to the outwardly exposed terminal and configured to cut off the conductive path when an internal pressure of the battery outer case exceeds a predetermined pressure; and
    the current shut-off mechanism includes the connection plate as a plate-shaped conductive member provided in one end of the collector terminal, the connection plate with the vent hole provided in a central part of the connection plate, and the shut-off valve including the reversing portion electrically connected to the outwardly exposed terminal.

11. The manufacturing method according to claim 10, wherein the reversing portion includes a dome-shaped concave portion that is concaved toward the inner side of the battery outer case.

12. The manufacturing method according to claim 10, wherein, when the metallic material is sprayed to the border between the joint region and the reversing portion, any one of plasma spraying, flame spraying, electric arc spraying, and cold spray is used.

13. The manufacturing method according to claim 10, wherein, when the metallic material is sprayed, a distance from a tip end of a thermal-spray nozzle that sprays the metallic material to the border is from 250 mm to 350 mm.

14. The manufacturing method according to claim 10, wherein, when the metallic material is sprayed, the thermal-spray joint portion is formed at 200° C. or less.

* * * * *

UNITED STATES PATENT AND TRADEMARK OFFICE
CERTIFICATE OF CORRECTION

PATENT NO. : 10,483,521 B2
APPLICATION NO. : 16/106837
DATED : November 19, 2019
INVENTOR(S) : Tomohiro Ono and Yuta Nemoto It is certified that error appears in the above-identified patent and that said Letters Patent is hereby corrected as shown below:

In the Specification

In Column 7, Line 8, delete "sectional, view" and insert --sectional view--, therefor.

In Column 9, Line 59, delete "terminal 10 the" and insert --terminal 10, the--, therefor.

In Column 10, Line 63, delete "Hereby;" and insert --Hereby,--, therefor.

In Column 11, Line 18, after "reversing portion", insert --42--.

In Column 11, Line 51, delete "between, the" and insert --between the--, therefor.

Signed and Sealed this
Fourth Day of February, 2020

Andrei Iancu
*Director of the United States Patent and Trademark Office*